US 11,569,746 B2

(12) United States Patent
Fromme et al.

(10) Patent No.: US 11,569,746 B2
(45) Date of Patent: Jan. 31, 2023

(54) DC COUPLED ELECTRICAL CONVERTER

(71) Applicant: Siemens Aktiengesellschaft, Munich (DE)

(72) Inventors: Christopher Fromme, Fürth (DE); Marvin Tannhäuser, Hausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/631,751

(22) PCT Filed: Jun. 26, 2018

(86) PCT No.: PCT/EP2018/067032
§ 371 (c)(1),
(2) Date: Jan. 16, 2020

(87) PCT Pub. No.: WO2019/015920
PCT Pub. Date: Jan. 24, 2019

(65) Prior Publication Data
US 2020/0169171 A1 May 28, 2020

(30) Foreign Application Priority Data
Jul. 20, 2017 (DE) ............... 10 2017 212 462.8

(51) Int. Cl.
*H02M 3/158* (2006.01)
*H02M 1/00* (2006.01)
(52) U.S. Cl.
CPC ........ *H02M 3/1582* (2013.01); *H02M 1/0095* (2021.05)
(58) Field of Classification Search
CPC .... H02M 3/158; H02M 3/156; H02M 7/5387; H02M 1/00; H02M 3/1588; H02M 3/155;
(Continued)

(56) References Cited

U.S. PATENT DOCUMENTS 5,793,190 A * 8/1998 Sahlstrom ............... H02M 1/34
323/222
6,259,234 B1 * 7/2001 Perol ..................... H02M 3/158
323/222
(Continued)

FOREIGN PATENT DOCUMENTS

CN 105186916 A 12/2015 ............... H02J 9/04
CN 106655765 A 5/2017 ............ H02M 3/156
(Continued)

OTHER PUBLICATIONS

German Office Action, Application No. 10 2017 212 462.8, 6 pages, dated Aug. 8, 2018.
(Continued)

*Primary Examiner* — Gustavo A Rosario-Benitez
(74) *Attorney, Agent, or Firm* — Slayden Grubert Beard PLLC (57) ABSTRACT

Various embodiments include a DC coupled electrical converter for converting an input voltage applied to first connections to an output voltage comprising: a boost converter connected on the input side to the first connections; an inverting buck-boost converter connected on the input side to the first connections; and a series circuit including two capacitors, the series circuit connected to an output-side positive pole of the boost converter and to an output-side negative pole of the inverting buck-boost converter. An output-side negative pole of the boost converter and an output-side positive pole of the inverting buck-boost converter are connected to a center connection between the capacitors.

5 Claims, 8 Drawing Sheets

(58) Field of Classification Search
CPC ....... H02M 1/0077; H02M 2001/0077; H02M 3/1586
See application file for complete search history.

(56) References Cited

U.S. PATENT DOCUMENTS

| | | | | |
|---|---|---|---|---|
| 6,486,642 | B1* | 11/2002 | Qian | H02M 3/158 323/255 |
| 8,116,103 | B2* | 2/2012 | Zacharias | H02J 3/383 363/17 |
| 9,641,079 | B2* | 5/2017 | Schmalnauer | H02M 3/1582 |
| 2008/0174287 | A1 | 7/2008 | Park | 323/271 |
| 2008/0266919 | A1* | 10/2008 | Mallwitz | H02M 3/158 363/124 |
| 2011/0020720 | A1* | 1/2011 | Chatroux | H02M 3/1584 429/432 |
| 2011/0080147 | A1 | 4/2011 | Schoenlinner et al. | 323/282 |
| 2011/0103117 | A1* | 5/2011 | Yoneda | H02M 7/48 363/132 |
| 2011/0103118 | A1* | 5/2011 | Serpa | H02M 3/158 363/132 |
| 2012/0086417 | A1* | 4/2012 | Osada | B60L 3/003 323/282 |
| 2013/0038273 | A1* | 2/2013 | Riggio | B60L 53/22 320/107 |
| 2015/0016159 | A1* | 1/2015 | Deboy | H02J 3/381 363/71 |
| 2015/0207429 | A1 | 7/2015 | Akiyama | 363/131 |
| 2015/0244259 | A1* | 8/2015 | Kaiser | B64D 41/00 307/9.1 |
| 2015/0295491 | A1 | 10/2015 | Lenz et al. | 323/234 |
| 2015/0349638 | A1* | 12/2015 | Sylla | H02M 3/158 307/10.1 |
| 2016/0129269 | A1 | 5/2016 | Nimmagadda et al. | 607/60 |
| 2016/0226372 | A1* | 8/2016 | Willenberg | H02M 7/04 |
| 2016/0359415 | A1* | 12/2016 | Friebe | H02M 1/44 |
| 2017/0324329 | A1* | 11/2017 | Zhang | H02J 3/383 |
| 2018/0166979 | A1 | 6/2018 | Shimizu et al. | |
| 2018/0241243 | A1* | 8/2018 | Zhu | H02M 1/14 |

FOREIGN PATENT DOCUMENTS

| | | | |
|---|---|---|---|
| DE | 10 2006 014 780 A1 | 10/2007 | ............ H02M 3/156 |
| DE | 20 2011 102 068 U1 | 10/2012 | ............ H02M 3/158 |
| WO | 2009/065678 A1 | 5/2009 | ............ H02M 3/158 |
| WO | 2019/015920 A1 | 1/2019 | ............ H02M 3/158 |

OTHER PUBLICATIONS

International Search Report and Written Opinion, Application No. PCT/EP2018/067032, 16 pages, dated Dec. 13, 2018.
Indian Office Action, Application No. 201917052069, 6 pages, dated Aug. 7, 2020.
Gitau, Michael Njoroge et al., "Analysis and Design of a Single-Phase Tapped-Coupled-Inductor Boost DC-DC Converter," Journal of Power Electronics, vol. 13, No. 4, pp. 636-646, Jul. 20, 2013.
European Office Action, Application No. 18739750.0, 7 pages, dated Oct. 1, 2021.
Chinese Office Action, Application No. 201880047771.2, 23 pages, dated Aug. 12, 2022.

* cited by examiner

DC COUPLED ELECTRICAL CONVERTER

CROSS-REFERENCE TO RELATED APPLICATIONS

This application is a U.S. National Stage Application of International Application No. PCT/EP2018/067032 filed Jun. 26, 2018, which designates the United States of America, and claims priority to DE Application No. 10 2017 212 462.8 filed Jul. 20, 2017, the contents of which are hereby incorporated by reference in their entirety.

TECHNICAL FIELD

The present disclosure relates to electrical converters. Various embodiments may include DC coupled electrical converters.

BACKGROUND

Transformational, that is to say DC decoupled, DC-DC converters are typically used for the DC-DC conversion of an input voltage of for example 20 V to an output voltage of for example 400 V, that is to say at a transformation ratio of 20 or more. They usually use an inverter, a transformer and a rectifier with subsequent smoothing to convert the input voltage to the output voltage.

SUMMARY

The teachings of the present disclosure describe an improved electrical converter, which has, in particular, a reduced installation size with respect to known solutions. For example, some embodiments include a DC coupled electrical converter (10, 20, 30, 40) for converting an input voltage applied to first connections (11A, 11B) to an output voltage, having: a boost converter connected on the input side to the first connections (11A, 11B), an inverting buck-boost converter connected on the input side to the first connections (11A, 11B), and a series circuit composed of two capacitors (C1, C2), which is connected to the output-side positive pole (13A) of the boost converter and to the output-side negative pole (13B) of the inverting buck-boost converter, wherein the output-side negative pole of the boost converter and the output-side positive pole of the inverting buck-boost converter are connected to the center connection (12A) between the capacitors (C1, C2).

In some embodiments, the boost converter comprises a first series circuit of a first semiconductor switch (S1) or a first diode (D1) with a second semiconductor switch (S2), the outer connections of which form the output-side poles of the boost converter and a first inductance (L1), which is connected to the center connection (12B) of the first series circuit and to the positive pole (11A) of the input voltage.

In some embodiments, the inverting buck-boost converter comprises a second series circuit of a third semiconductor switch (S3) with a fourth semiconductor switch (S4) or a second diode (D2), of which one outer connection forms the output-side negative pole of the inverting buck-boost converter and the other outer connection is connected to the positive pole (11A) of the input voltage, wherein the inverting buck-boost converter furthermore comprises a second inductance (L2), which is connected to the center connection (12C) of the second series circuit and to the center connection (12A) between the capacitors (C1, C2).

In some embodiments, there is a fifth semiconductor switch (S5) between the first inductance (L1) and the positive pole (11A) of the input voltage and a sixth semiconductor switch (S6) or a third diode (D3) between the first inductance (L1) and the negative pole (11B) of the input voltage.

In some embodiments, there is a third inductance (L3), which is connected in the first series circuit in series between the first semiconductor switch (S1) or the first diode (D1) and the second semiconductor switch (S2), wherein the first and third inductance (L1, L3) are configured as a joint inductance with a center tap for the second semiconductor switch (S2).

In some embodiments, there is a fourth inductance (L4), which is connected in the second series circuit in series between the third semiconductor switch (S3) and the fourth semiconductor switch (S4) or the second diode (D2), wherein the second and fourth inductance (L2, L4) are configured as a joint inductance with a center tap for the third semiconductor switch (S3).

In some embodiments, the semiconductor switches (S1, S2) of the boost converter and the semiconductor switches (S3, S4) of the inverting buck-boost converter are operated with staggered clocking.

As another example, some embodiments include a power converter (60, 80, 90, 100), which comprises an electrical converter (10, 20, 30, 40) as described above and a full-bridge (V), which is connected by way of the outer connections in parallel with the series circuit composed of two capacitors (C1, C2), the center connections of said full-bridge forming output connections for the power converter (60, 80, 90, 100).

In some embodiments, there is a control device, which is configured to operate the boost converter in such a way that a first half-wave-shaped voltage (UC1) is generated at the output of said boost converter and to operate the inverting buck-boost converter in such a way that a second half-wave-shaped voltage (UC2) is generated at the output of said inverting buck-boost converter, the polarity of said second half-wave-shaped voltage being opposite to that of the first voltage.

In some embodiments, the control device is configured to use the grid frequency as the frequency for the half-wave-shaped voltages (UC1, UC2).

In some embodiments, the control device is configured to switch over the semiconductor switches (S7 ... 10) of the full-bridge (V) at the grid frequency.

In some embodiments, there are a fifth and sixth inductance (L5, L6) in series with the output connections and a third capacitor (C3) connected between the output connections.

In some embodiments, a further output connection for a split phase grid is formed by way of the center connection (12A) between the capacitors (C1, C2).

BRIEF DESCRIPTION OF THE DRAWINGS

Further advantages and features can be drawn from the following description of exemplary embodiments based on the figures. In the figures, identical reference signs denote identical components and functions.

In the figures.

DETAILED DESCRIPTION

In some embodiments, a DC coupled electrical converter for converting an input voltage applied to first connections to an output voltage comprises a boost converter connected on the input side to the first connections and an inverting buck-boost converter connected on the input side to the first connections. The converter also has a series circuit composed of two capacitors, which is connected to the output-side positive pole of the boost converter and to the output-side negative pole of the inverting buck-boost converter, wherein the output-side negative pole of the boost converter and the output-side positive pole of the inverting buck-boost converter are connected to one another and to the center connection between the capacitors. In some embodiments, such a converter made of a combination of a boost converter (step-up converter) and an inverting buck-boost converter can provide a comparatively high output voltage by way of the series connection of the outputs. Since each of the converters has to provide only approximately half the output voltage, the respective transformation ratio is significantly reduced with respect to the case of an individual converter.

As a result thereof, it is possible to also provide a high transformation ratio of for example more than 20, in particular more than 25, without a transformer. As a result, the transformer may be saved and therefore an improved level of efficiency is achieved. Since the transformer is typically larger and also more expensive than a simple inductive component, the converter according to the invention also achieves a smaller installation size and lower costs for the construction of the converter. Furthermore, due to the construction of the converter, it is also possible to use both output voltages separately from one another.

In some embodiments, the following features can also additionally be provided for the current converter:

The boost converter and inverting buck-boost converter are typically operated as DC-DC converters. In some embodiments, it is sought to provide an output voltage that is as uniform as possible. The converter can likewise be operated so that essentially a DC voltage is applied at the output thereof in the form of the two capacitors. The type of operation is determined here by way of a control device, which performs the switching operations of the semiconductor switches present in the converters. However, the control device may also be configured to provide a different voltage form to a DC voltage at the output of the converter.

The boost converter may comprise a first series circuit of a first semiconductor switch or a first diode with a second semiconductor switch. The outer connections of the first series circuit in this case form the output-side poles of the boost converter. Furthermore, the boost converter comprises a first inductance, which is connected to the center connection of the first series circuit and to the positive pole of the input voltage. This produces a step-up converter. A unidirectional flow of energy is made possible with the use of a diode. If the first series circuit comprises the first semiconductor switch, both flow of energy directions from the boost converter are supported. To illustrate the construction variants, it is repeated in other words that the first series circuit may have either two semiconductor switches or else one semiconductor switch and one diode. Both construction variants are able to be combined with the variants mentioned in the following text.

The inverting buck-boost converter may comprise a second series circuit of a third semiconductor switch with a fourth semiconductor switch or a second diode. Of these, one outer connection forms the output-side negative pole of the inverting buck-boost converter and the other outer connection is connected to the positive pole of the input voltage. The inverting buck-boost converter furthermore comprises a second inductance, which is connected to the center connection of the second series circuit and to the center connection between the capacitors. This produces an inverting buck-boost converter. A unidirectional flow of energy is again made possible with the use of the second diode. In contrast, if the second series circuit comprises the fourth semiconductor switch, both flow of energy directions from the inverting buck-boost converter are supported. To illustrate the construction variants, it is repeated in other words that the second series circuit may have either two semiconductor switches or else one semiconductor switch and one diode. Both construction variants are able to be combined with the variants mentioned in the following text and above.

The converter may have a fifth semiconductor switch between the first inductance and the positive pole of the input voltage. In this case, the converter furthermore comprises a sixth semiconductor switch or a third diode between the first inductance and the negative pole of the input voltage. Normally, the boost converter can generate only higher voltages than the input voltage at the output thereof owing to its principle. The fifth and sixth semiconductor switch make it possible to also present lower voltages than the input voltage. If the converter has the sixth semiconductor switch, both flow of energy directions are supported. If the converter has the third diode, the flow of energy direction from the side of the input voltage is supported.

The converter may comprise a third inductance, which is connected in the first series circuit in series between the first semiconductor switch or the first diode and the second semiconductor switch. As a result, the possible transformation ratio for the boost converter is further increased. In this case, the first and third inductance are constructed as a joint inductance with a center tap for the second semiconductor switch. A joint inductance here means that the inductances have a joint magnetic circuit, that is to say are arranged on a joint core.

The converter may comprise a fourth inductance, which is connected in the second series circuit in series between the third semiconductor switch and the fourth semiconductor switch or the second diode. As a result, the possible transformation ratio for the inverting buck-boost converter is further increased. In this case, the second and fourth inductance are constructed as a joint inductance with a center tap for the third semiconductor switch. Like in the case of the first and third inductance, a joint inductance here means that the inductances have a joint magnetic circuit, that is to say are arranged on a joint core.

The semiconductor switches of the boost converter and of the inverting buck-boost converter may be operated by way of the control device with staggered clocking. This causes the switching frequency in the converter to appear to be doubled with respect to the switching frequency of the semiconductor switches for example in the boost converter. The necessary size for the inductances and capacitances of EMC filters, for example at the input of the converter, is decreased as a result. The components are significantly smaller and lighter as a result. Since size and weight of these components typically have a significant proportion of the overall size and of the overall weight of a converter, the entire converter becomes smaller and lighter in a noticeable manner as a result.

The boost and the inverting buck-boost converter can be operated so that their output voltages are equal. Alternatively, they can be operated so that their output voltages are different from one another.

The electrical converter can be used as part of a power converter. The power converter comprises an electrical converter according to the above description. The power converter furthermore comprises a full-bridge, which is connected by way of the outer connections in parallel with the series circuit composed of two capacitors, the center connections of said full-bridge again forming output connections for the power converter. In other words, the electrical converter according to the invention is expanded by the full-bridge connected on the output side to form a power converter.

For example, the power converter supports flow of energy from the side of the first connections of the converter to the output connections of the power converter, wherein the power converter in this case operates as an inverter. The control device of the electrical converter is also responsible for controlling the full-bridge for the rest of the description. For operation as an inverter, said control device is configured to operate the boost converter in such a way that a first half-wave-shaped voltage is generated at the output of said boost converter, that is to say at a first of the capacitors. The inverting buck-boost converter is furthermore operated in such a way that a second half-wave-shaped voltage is generated at the output of said inverting buck-boost converter that is to say at the second of the capacitors, the polarity of said second half-wave-shaped voltage being opposite to that of the first voltage. The phase of the half-waves may be identical here. Owing to the polarities of the half-waves, the amplitudes thereof then add up.

It is understood that the shape of half-waves is not perfect. Owing to the switching behavior of the respective semiconductor switches, which are switched at high frequencies, the half-wave shape has harmonics. Furthermore, the voltage in the boost converter is limited to voltages above the input voltage so that the half-wave shape cannot achieve the voltage of 0 V. The half-wave must thus be understood as an idealized and targeted shape that can be achieved only approximately in the reality of the electrical converter.

The control device is furthermore configured to drive the semiconductor switches of the full-bridge so that the applied half-waves are advanced, wherein the polarity of the advancing is switched over after each half-wave. To this end, the semiconductor switches of the full-bridge must be switched over only at double the frequency of the half-waves, that is to say up to a factor of 2 at the frequency that corresponds to the generated AC voltage. The frequency of the generated AC voltage is freely selectable. If an AC voltage at, for example, a grid frequency of 50 Hz is intended to be generated, the half-waves must be generated at this frequency and semiconductor switches of the full-bridge must be switched over at each zero crossing of the AC voltage, that is to say at 100 Hz. The switching frequency of the semiconductor switches of the full-bridge is therefore very low for typical inverter ratios.

The described inverter is able to be used for example as a solar inverter or for battery charging devices.

In the case of operation as an inverter with said flow of energy direction, it is possible to use the first diode in the first series circuit and the second diode in the second series circuit. In other words, the first series circuit comprises the first diode and the second semiconductor switch and the second series circuit comprises the second diode and the third semiconductor switch, while the first and fourth semiconductor switch are not present.

Depending on the type of operation, however, even in the case of the flow of energy direction from the side of the first connections of the converter to the output connections of the power converter, it may also be expedient to use not the first and second diode but the first and fourth semiconductor switch. This is the case, for example, in the described generation of half-waves since here energy has to be drawn from the first and second capacitor actively during the falling edges of the half-waves.

The power converter also supports a flow of energy in the reverse direction, wherein then the first and fourth semiconductor switch are expediently present, that is to say the first and second series circuit each comprise two semiconductor switches. In this case, the power converter operates as a rectifier.

The power converter may also additionally include the following features:

The control device may be configured to check whether the magnitude of the voltage to be generated by the boost converter is lower than the input voltage. In this case, the boost converter cannot represent the voltage. This case may arise when the boost converter is intended to generate at the first capacitor a DC voltage whose magnitude is lower than that of the input voltage. The case may furthermore arise when the boost converter generates the half-waves already described. In this case, there is always a portion of the half-wave in which the voltage is lower than the input voltage. Depending on the amplitude of the half-wave, this may even be the case for the entire half-wave.

If the control device identifies that a voltage below the input voltage is intended to be generated, it may be configured to perform one of two measures. A first measure results from the fact that the boost converter comprises the fifth and sixth semiconductor switch. The control device then additionally drives said two semiconductor switches in order to generate a voltage below the input voltage.

For this purpose, it is possible to use two different types of operation of the driving by way of which the first, second, fifth and sixth semiconductor switch are driven. In the first type of operation, either the first and second semiconductor switch are used to generate the shape of the output voltage while the fifth semiconductor switch is switched on and the sixth semiconductor switch switched off or else vice versa the fifth and sixth semiconductor switch are used to generate the shape of the output voltage while the first semiconductor switch is switched on and the second semiconductor switch is switched off. The first and second semiconductor switch are used when the output voltage is higher than the input voltage. The fifth and sixth semiconductor switch are used when the output voltage is lower than the input voltage. In other words, the boost converter that is formed with the first and second semiconductor switch and the buck converter that is formed with the fifth and sixth semiconductor switch are used at alternating times and independently of one another.

A second type of operation results from the fact that the first, second, fifth and sixth semiconductor switch are connected diagonally. For this, a change is made between two switching states, wherein in the first switching state the first and sixth semiconductor switch are switched on and in the second switching state the second and fifth semiconductor switch are switched on. In this type of operation, the boost converter and the buck converter thus act at the same time and not independently of one another. This second type of operation comprises simplified control as a result.

A second alternative measure can be performed by the control device when the boost converter does not comprise the fifth and sixth semiconductor switch. In this case, the semiconductor switches of the full-bridge are used in order to perform a correction of the output voltage of the boost converter. To this end, the semiconductor switches of the full-bridge are preferably switched at a high frequency, for example at a frequency between 50 kHz and 500 kHz, and are to perform the correction of the voltage by way of pulse-width modulation.

In order to improve the quality of the generated AC voltage in the case of high-frequency driving of the full-bridge, the power converter may have a third and fourth inductance in series with the output connections and a capacitor connected between the output connections. An output filter is produced as a result thereof.

As an alternative to the circuit of the full-bridge at a high frequency, the power converter may be constructed using the fifth and sixth semiconductor switch. It is thereby possible to output lower voltages than the input voltage even in the boost converter.

A further output connection of the power converter can be formed by the center connection between the capacitors. This makes possible operation by way of a split phase grid, such as in the USA for example.

The control device can be configured to operate the inverting buck-boost converter and the boost converter in such a way that the amplitude of the generated half-wave of the inverting buck-boost converter is different from the amplitude of the half-wave generated by the inverting buck-boost converter. As a result, identical switching voltages and ripple currents can be achieved.

Figure 1:
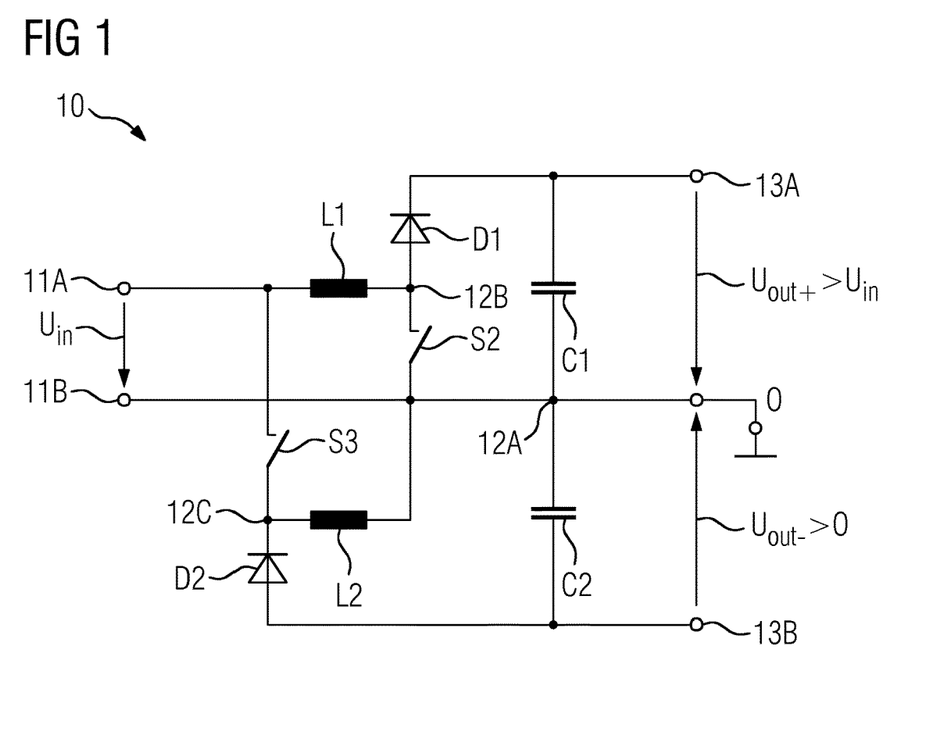
FIGS. 1 to 4 show various embodiments for the electrical converter.

FIG. 1 shows a circuit diagram for a first example converter 10. In terms of its construction, the converter 10 corresponds to an interconnection of a boost converter and an inverting buck-boost converter, wherein the respective outputs are connected in series. The converter 10 has a first and second input connection 11A, 11B for the input voltage, wherein the first input connection 11A is to be used as positive pole. The converter 10 furthermore has a first and second output connection 13A, 13B, wherein the first output connection 13A likewise typically represents the positive pole. The converter 10 furthermore has three electrical nodes 12A, 12B, 12C, on the basis of which the construction is described.

The first node 12A is directly connected to the second input connection 11B and furthermore connected to ground. A first inductance L1 is arranged between the first input connection 11A and the second node 12B. A first diode D1 is arranged between the first output connection 13A and the second node 12B. The first diode D1 is oriented so that current conduction from the second node 12B is possible. A second semiconductor switch S2 is arranged between the second node 12B and the first node 12A.

A first capacitor C1 is arranged between the first output connection 13A and the first node 12A, said first capacitor representing the output of the boost converter, which is formed from the first diode D1, the second semiconductor switch S2 and the first inductance L1.

A third semiconductor switch S3 is arranged between the first input connection 11A and the third node 12C. A second diode D2 is arranged between the second output connection 13B and the third node 12C. The second diode D2 is oriented so that current conduction from the second output connection 13B is possible. A second inductance L2 is arranged between the third node 12C and the first node 12A.

A second capacitor C2 is arranged between the second output connection 13B and the first node 12A, said second capacitor representing the output of the inverting buck-boost converter, which is formed from the second diode D2, the third semiconductor switch S3 and the second inductance L2.

The semiconductor switches S2, S3 in the converter 10 are in this example GaN switches. However, other switches such as MOSFETs or IGBTs can also be used.

During operation of the circuit, the boost converter generates a positive voltage at the first capacitor C1. Said positive voltage is at least as high as the input voltage at the input connections 11A, 11B owing to its principle. The inverting buck-boost converter in turn generates a negative voltage at the second output connection 13B relative to the first node 12A. Owing to the series connection of the two capacitors C1, C2, the magnitude of the output voltage between the two output connections 13A, 13B is the sum of the magnitudes of the two generated voltages. The transformation ratio that results in the case of a given input and output voltage is therefore halved in each case for the boost converter and the inverting buck-boost converter.

Figure 2:
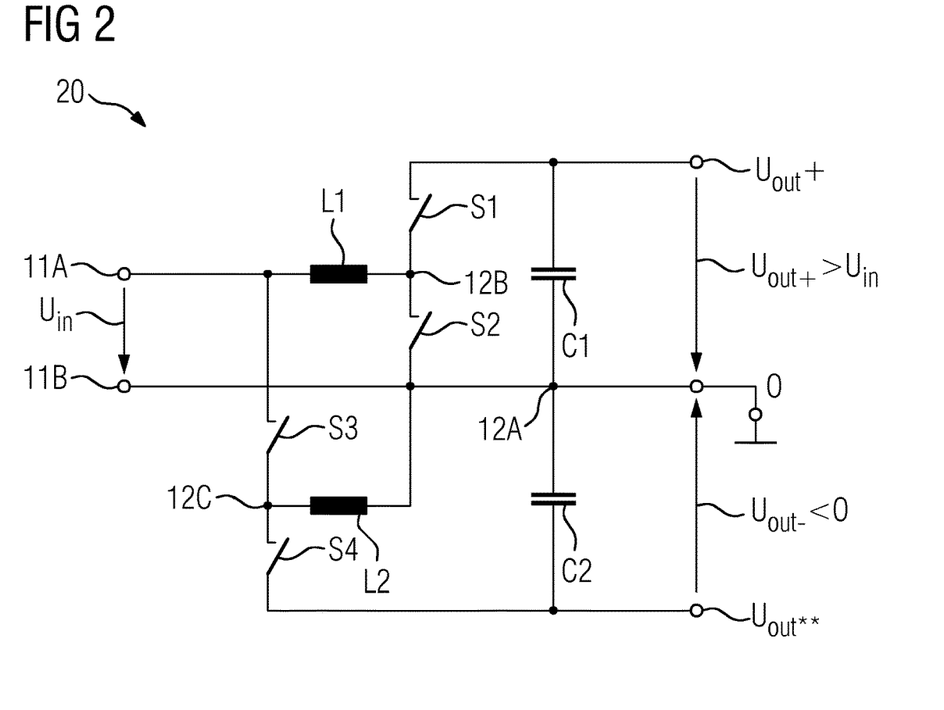

FIG. 2 shows a second example converter 20 having an alternative construction to the converter 10 of FIG. 1. The construction of the converter 20 differs from the converter 10 according to FIG. 1 in that a first semiconductor switch S1 is now present in the place of the first diode D1. Furthermore, a fourth semiconductor switch S4 is present instead in the place of the second diode D2.

The converter 20 can be operated in a manner analogous to the converter 10 according to FIG. 1. In addition, however, in the case of the converter 20 an extended operation can also take place, in which the target voltages at the capacitors C1, C2 are no longer DC voltages but other wave shapes, that is to say generally mixed voltages. To this end, a control device, which is not shown in the figures, is present, said control device being configured, for the extended operation, to switch the first to fourth semiconductor switch S1 . . . S4 by means of pulse-width modulation so that the desired voltage profile is produced at the capacitors C1, C2.

Such a desired voltage profile may exist, for example, in a sequence of half-waves or in a DC voltage with additional modulation. Since the generated voltages at the first and second capacitor C1, C2 furthermore add up to form the output voltage, a high amplitude with a moderate transformation ratio for the converter can be achieved even in the case of a mixed voltage. For the sequence of half-waves, for example, both the boost converter and the inverting buck-boost converter can generate a half-wave profile of the same phase and amplitude. The amplitudes of the half-waves in the output voltage then add up at the output connections 13A, 13B.

A restriction in operation of the converter 20 according to FIG. 2 consists in that the boost converter cannot generate an output voltage below the input voltage. As a result, not all of the DC voltages and not all of the mixed voltage profiles can be generated. The converter 30 according to FIG. 3 contains a possible solution for this. The converter 30 comprises the components of the converter 20 according to FIG. 2. In addition to the converter 20, a fourth node 12D is present between the first inductance L1 and the first input connection 11A. A fifth semiconductor switch S5 is arranged between the fourth node 12D and the first input connection 11A. A sixth semiconductor switch S6 is arranged between the fourth node 12D and the first node 12A.

Figure 3:
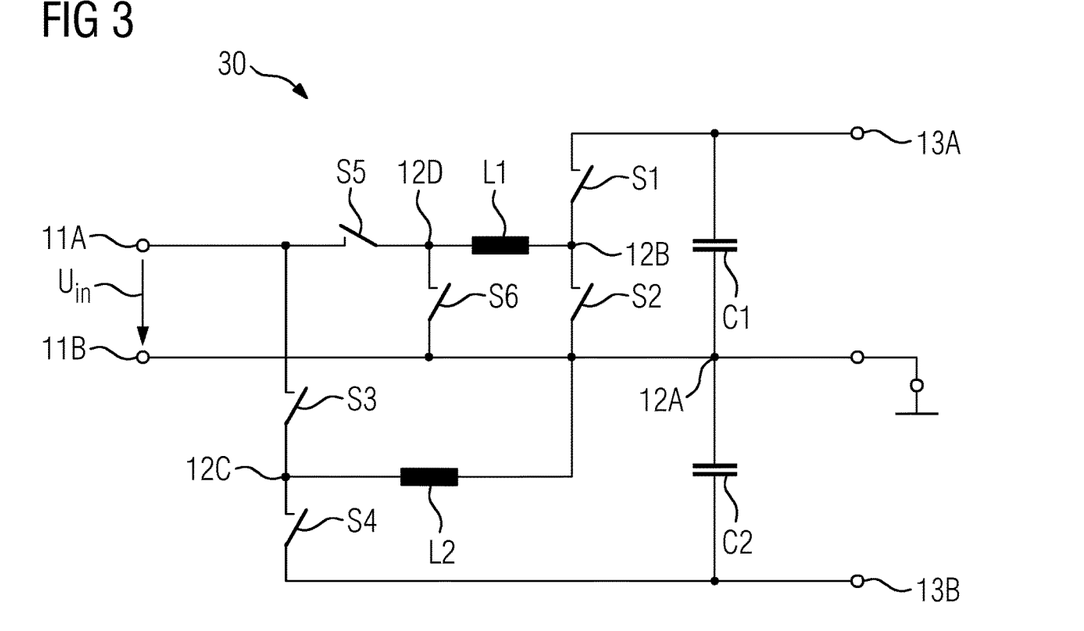

A combination of buck and boost converter (buck-boost converter) is realized by the additional semiconductor switches S5, S6 in connection with the components of the boost converter. The properties of the boost converter can be produced by switching off the sixth semiconductor switch S6 and switching on the fifth semiconductor switch S5. If an output voltage that is lower than the input voltage is to be generated, the first semiconductor switch S1 can be switched on and the second semiconductor switch S2 can be switched off and therefore only the buck converter can be used. Therefore, the restriction of the converter 20 according to FIG. 2 with respect to the output voltage no longer exists and all of the positive DC voltages and wave shapes whose amplitude is not too high can be generated.

In an alternative type of operation, the first, second, fifth and sixth semiconductor switch S1, S2, S5, S6 can be connected diagonally. For this, a change is made between two switching states, wherein in the first switching state the first and sixth semiconductor switch S1, S6 are switched on and in the second switching state the second and fifth semiconductor switch S2, S5 are switched on. In this type of operation, the boost converter and the buck converter thus act the same time and not independently of one another.

Figure 4:
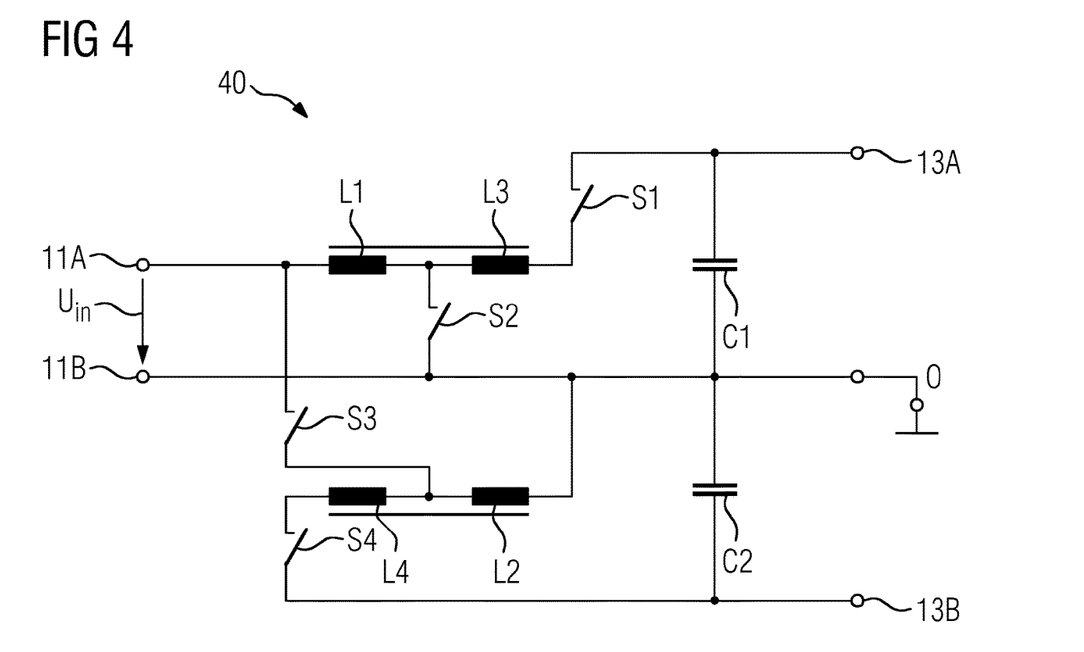

A further exemplary embodiment is illustrated in FIG. 4. The converter 40 according to FIG. 4 proceeds in terms of construction from the converter 20 according to FIG. 2. In addition to this, however, the converter 40 has a third inductance L3 between the second node 12B and the first semiconductor switch S1. The first and the third inductance L1, L3 are constructed in this example as a joint inductance with a center tap to which the second semiconductor switch S2 is connected.

The converter 40 furthermore has a fourth inductance L4 between the third node 12C and the fourth semiconductor switch S4. The second and the fourth inductance L2, L4 are in this example constructed in a manner analogous to the first and third inductance L1, L3 as a joint inductance with a center tap to which the third semiconductor switch S3 is connected.

Owing to the construction of the converter 40 according to FIG. 4, even higher transformation ratios between the output and the input voltage can be achieved.

Figure 5:
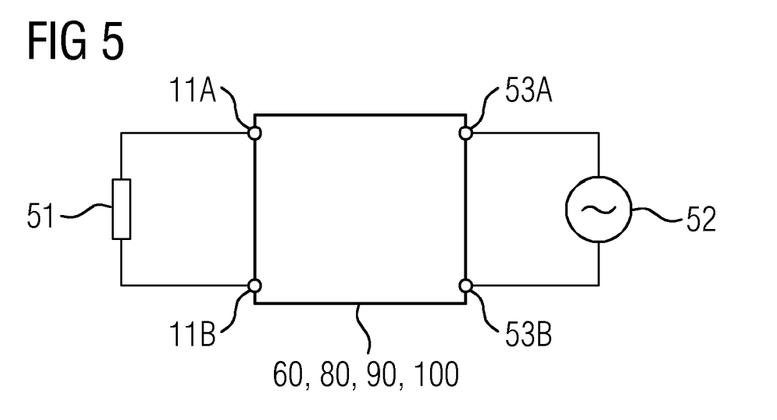
FIG. 5 shows a construction scheme of a photovoltaic installation having an inverter.

A possible field of application of the described converter 20, 30, 40 is described based on the following figures. In this case, an inverter is constructed using the respective converter 20, 30, 40, which inverter may be used, for example, as a solar micro-inverter. The use of such a solar micro-inverter is given in a rough outline in FIG. 5. The inverter 60, 80, 90, 100 is connected to a photovoltaic solar module 51 and to the supply grid 52. An inverter 60, 80, 90, 100 in the form of a solar micro-inverter is typically connected to precisely one solar module 51 and thereby differs from the conventional string inverter or central inverter. The inverter 60, 80, 90, 100 undertakes the conversion of the DC voltage coming from the solar module 51 to a voltage corresponding to the supply grid with a matching amplitude, frequency and phase.

Figure 6:
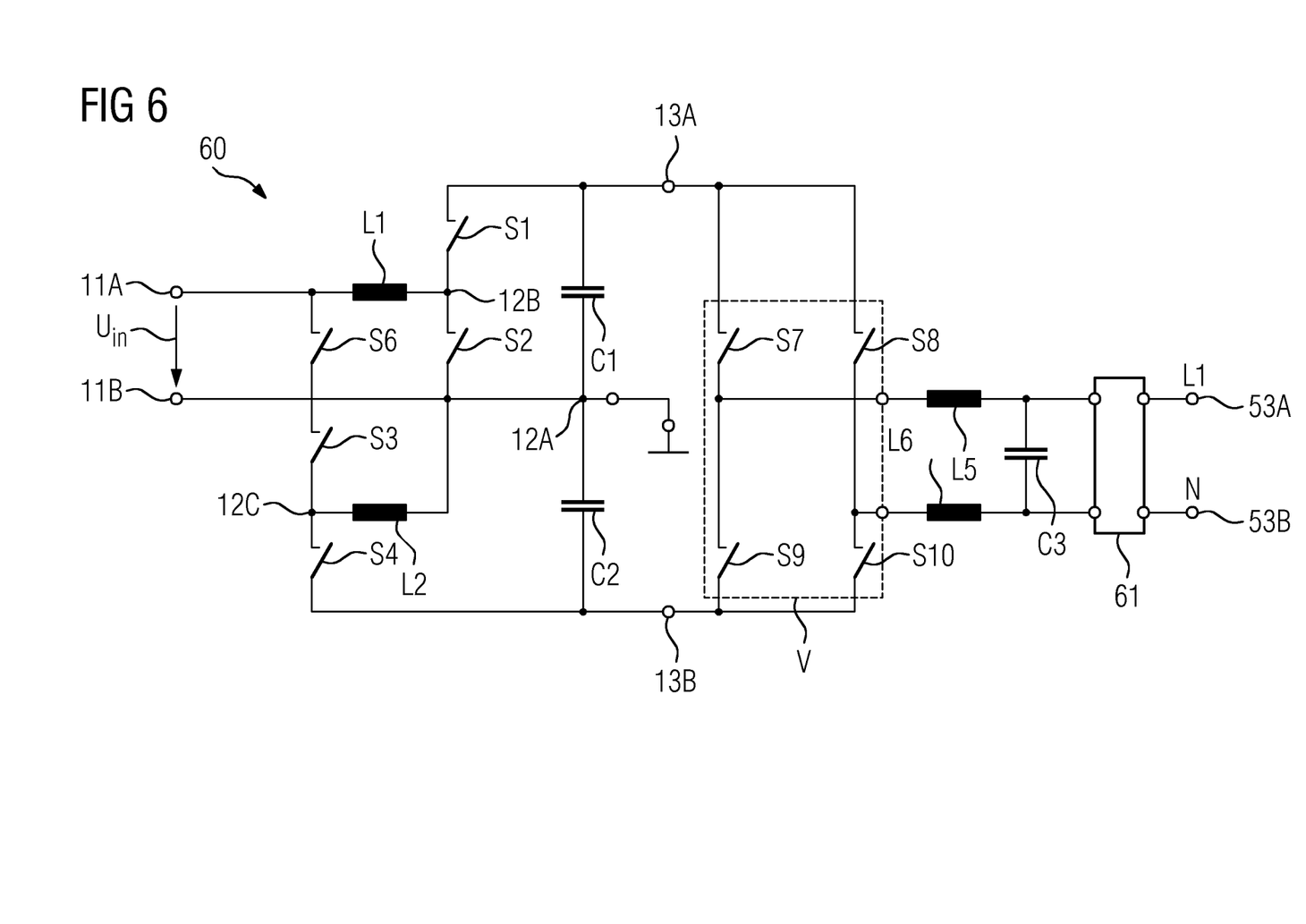
FIG. 6 shows an embodiment for an inverter using the electrical converter.

An exemplary construction for a first inverter 60 is shown in FIG. 6. The inverter has on the input side a converter 20, which is constructed according to FIG. 2. The output connections 13A, 13B of the converter 20 do not act as outputs for the inverter 60 but are connected to the outer connections of a full-bridge V. The full-bridge V comprises four further semiconductor switches S7, S8, S9, S10. The center connection of a first half-bridge of the full-bridge V having the seventh and ninth semiconductor switch S7, S9 is connected to a fifth inductance L5. The center connection of the second half-bridge of the full-bridge V having the eighth and tenth semiconductor switch S8, S10 is connected to a sixth inductance L6. The center connections are furthermore connected via a third capacitor. The two center connections are furthermore connected to an EMI filter 61. The output of the EMI filter 61 constitutes the two output connections 53A, 53B for the inverter 60.

Figure 7:
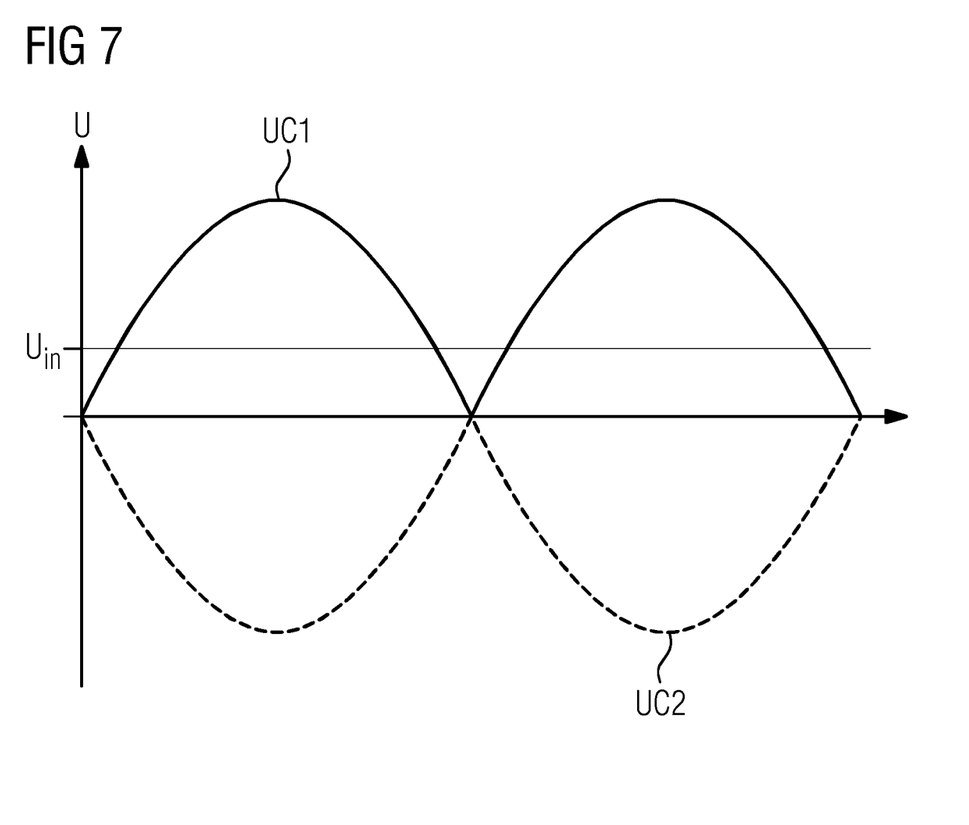
FIG. 7 shows voltages generated by the converter as part of the inverter.

Not illustrated in FIG. 6 is the control device for the inverter 60, which control device undertakes the driving of the semiconductor switches S1 . . . S10. For the function as an inverter, the first and second semiconductor switch S1, S2, that is to say the boost converter, are driven in such a way by way of pulse-width modulation that at the output of the boost converter, that is to say at the first capacitor C1, the profile of the voltage UC1 assumes the shape of sequential half-waves. This voltage profile is outlined in FIG. 7. The third and fourth semiconductor switch S3, S4, that is to say the inverting buck-boost converter, are driven in such a way that at the output of the inverting buck-boost converter, that is to say at the second capacitor C2, the profile of the voltage UC2 likewise assumes the shape of subsequent half-waves. In contrast to the typical operation as a DC-DC converter, the boost converter and the inverting buck-boost converter are thus now operated so that they each generate at their output precisely no constant DC voltage. The polarity of the voltage UC2 at the second capacitor in this case is such that in sum an increased amplitude for the voltage profile is produced between the first and second output connection 13A, 13B. Given the same amplitude of both voltage profiles UC1, UC2, twice the amplitude is produced in sum for the half-wave.

The resulting half-wave is applied to the outer connections of the full-bridge V. The full-bridge V is now driven in such a way that the polarity of the half-wave changes with each half-wave and therefore a voltage profile that is ideally sinusoidal is produced between the center connections of the full-bridge V. To this end, a change is made between two switching states. In the first switching state the eighth and ninth semiconductor switch S8, S9 are switched on and the seventh and tenth semiconductor switch S7, S10 are switched off. In the second switching state the seventh and tenth semiconductor switch S7, S10 are switched on and the eighth and ninth semiconductor switch S8, S9 are switched off. The change between these switching states is effected here with each half-wave. The frequency of the resulting sinusoidal voltage profile expediently corresponds to the frequency of the supply grid, that is to say for example 50 Hz. The half-waves are then generated so that they follow one another at 100 Hz and the full-bridge V must switch over the polarity at 100 Hz, with the result that a full sinusoidal wave is produced from each two half-waves. Consequently, the semiconductor switches S7 . . . S10 must switch at only 100 Hz, that is to say comparatively infrequently for converter ratios. Therefore, switches that are optimized for low line losses can therefore advantageously be used in the full-bridge.

Since in the inverter 60 of FIG. 6 the boost converter is not able to generate a lower voltage than the input voltage at the output thereof, the generated half-wave at the first capacitor C1 is incomplete. In time ranges in which the voltage in terms of the profile of the half-wave would actually have to be lower than the input voltage, it nevertheless corresponds approximately to the input voltage. The control device is expediently configured to deal with this problem. The control device is expediently configured, at least in the mentioned time ranges, to generate the voltage profile of the sinusoidal wave by connecting the semiconductor switches S7 . . . S10 of the full-bridge V. To this end, in these time ranges, the semiconductor switches S7 . . . S10 must be switched at high frequency and the voltage shape must be set via pulse-width modulation. The fifth and sixth inductance L5, L6 and the third capacitor C3 are configured for the necessary filtering of the resulting voltage shape even in the case of high-frequency switching of the full-bridge V.

Figure 8:
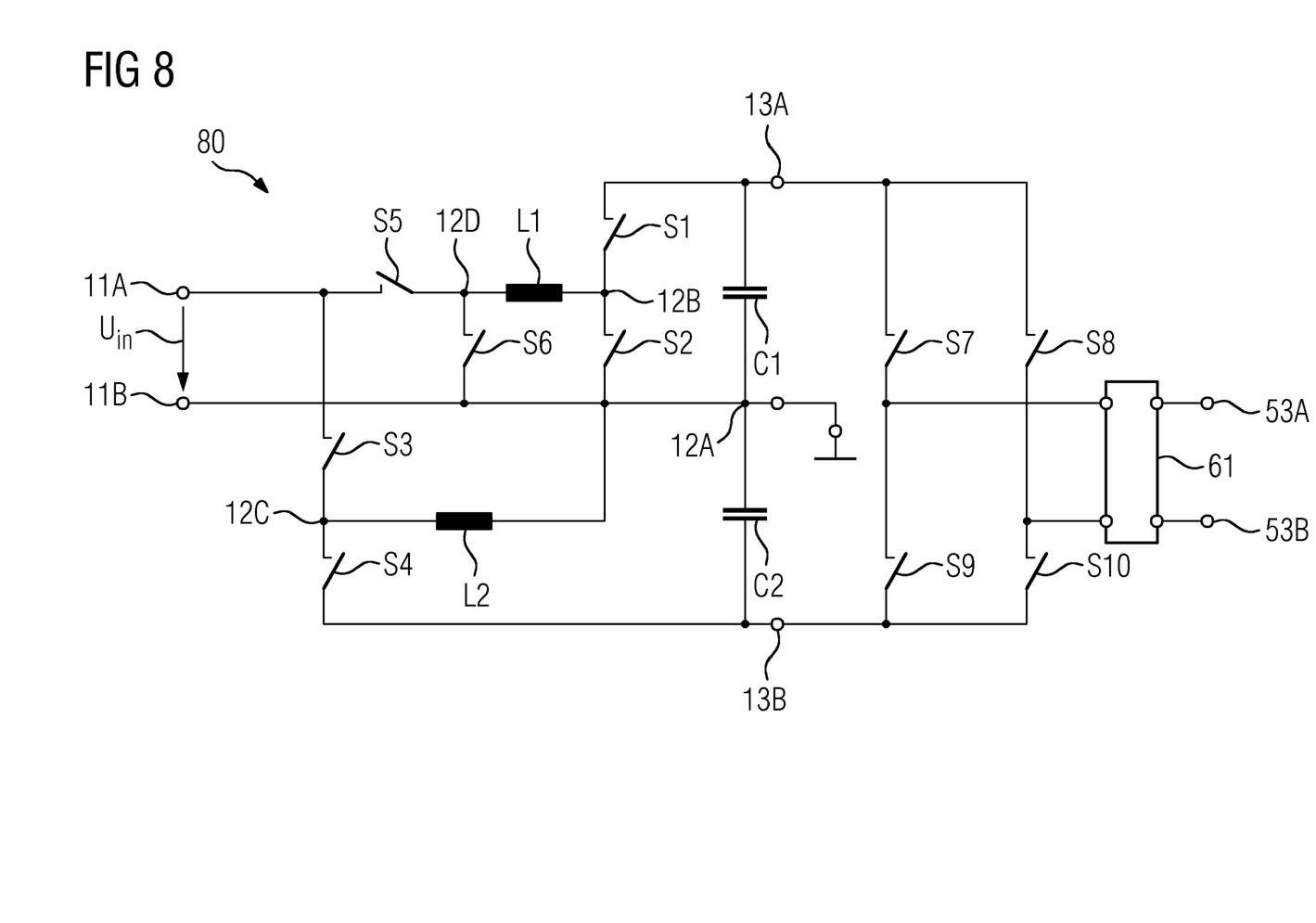
FIGS. 8 to 10 show further example embodiments for the inverter.

FIG. 8 shows as a further exemplary embodiment an inverter 80. The inverter 80 is approximately constructed like the inverter 60 according to FIG. 6. In contrast to the inverter 60 according to FIG. 6, the inverter 80 according to FIG. 8 is based on the converter 30 according to FIG. 3. In other words, the fifth and sixth semiconductor switch S5, S6 are thus present in the inverter 80 according to FIG. 8. For this purpose, the fifth and sixth inductance L5, L6 and the third capacitor C3 are not present in the inverter 80.

As already described for FIG. 3, the boost converter is extended by the fifth and sixth semiconductor switch S5, S6 to form a combined buck-boost converter. The restriction of the output voltage at the first capacitor C1 to voltages above the input voltage no longer exists as a result. The control device is in this case configured to use the fifth and sixth semiconductor switch S5, S6 in addition to the first and second semiconductor switch S1, S2 so that now the half-wave to be generated is present in full at the first capacitor C1. The voltages applied to the first and second capacitor C1, C2 therefore correspond as far as possible completely to the voltage profiles UC1, UC2 shown in FIG. 7.

The full-bridge V is now driven as already described for the inverter 60 of FIG. 6 in such a way that the polarity of the half-wave changes with each half-wave and therefore an ideally sinusoidal voltage profile is produced between the center connections of the full-bridge V. To this end, like in the inverter of FIG. 6, a change is made between two switching states. In the first switching state the eighth and ninth semiconductor switch S8, S9 are switched on and the seventh and tenth semiconductor switch S7, S10 are switched off. In the second switching state the seventh and tenth semiconductor switch S7, S10 are switched on and the eighth and ninth semiconductor switch S8, S9 are switched off.

Since the half-waves are now present completely, there is no need in the inverter 80 to provide high-frequency switching of the semiconductor switches S7 . . . S10 of the full-bridge V at specific times. Instead, the semiconductor switches S7 . . . S10 can be switched in principle at the frequency of for example 100 Hz. Therefore, in this case, even more so than in the case of the inverter 60, it holds true that switches that are optimized for low line losses can advantageously be used in the full-bridge. The necessity for filtering the high-frequency switching advantageously no longer exists, as a result of which the fifth and sixth inductance L5, L6 and the third capacitor C3 become unnecessary.

Figure 9:
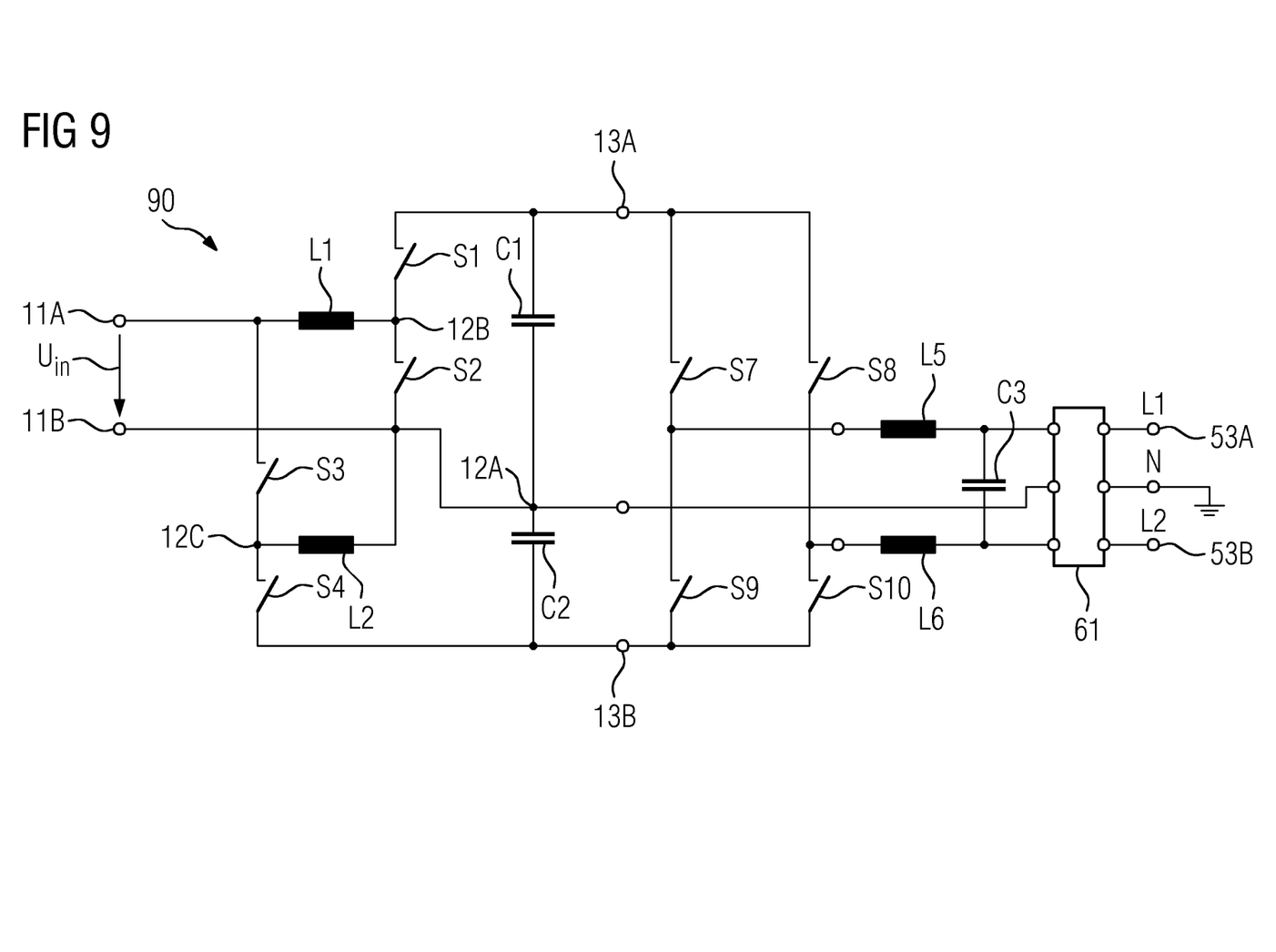

FIG. 9 shows as a further exemplary embodiment an inverter 90, which is configured for use in a split phase grid.

The construction of the inverter 90 including the configuration of the control device corresponds substantially to the construction of the inverter 60 according to FIG. 6. In addition, however, the first node 12A is provided as a further input for the EMI filter 61 and is led out of same as a neutral conductor. The other functionality corresponds to the inverter 60 according to FIG. 6.

Figure 10:
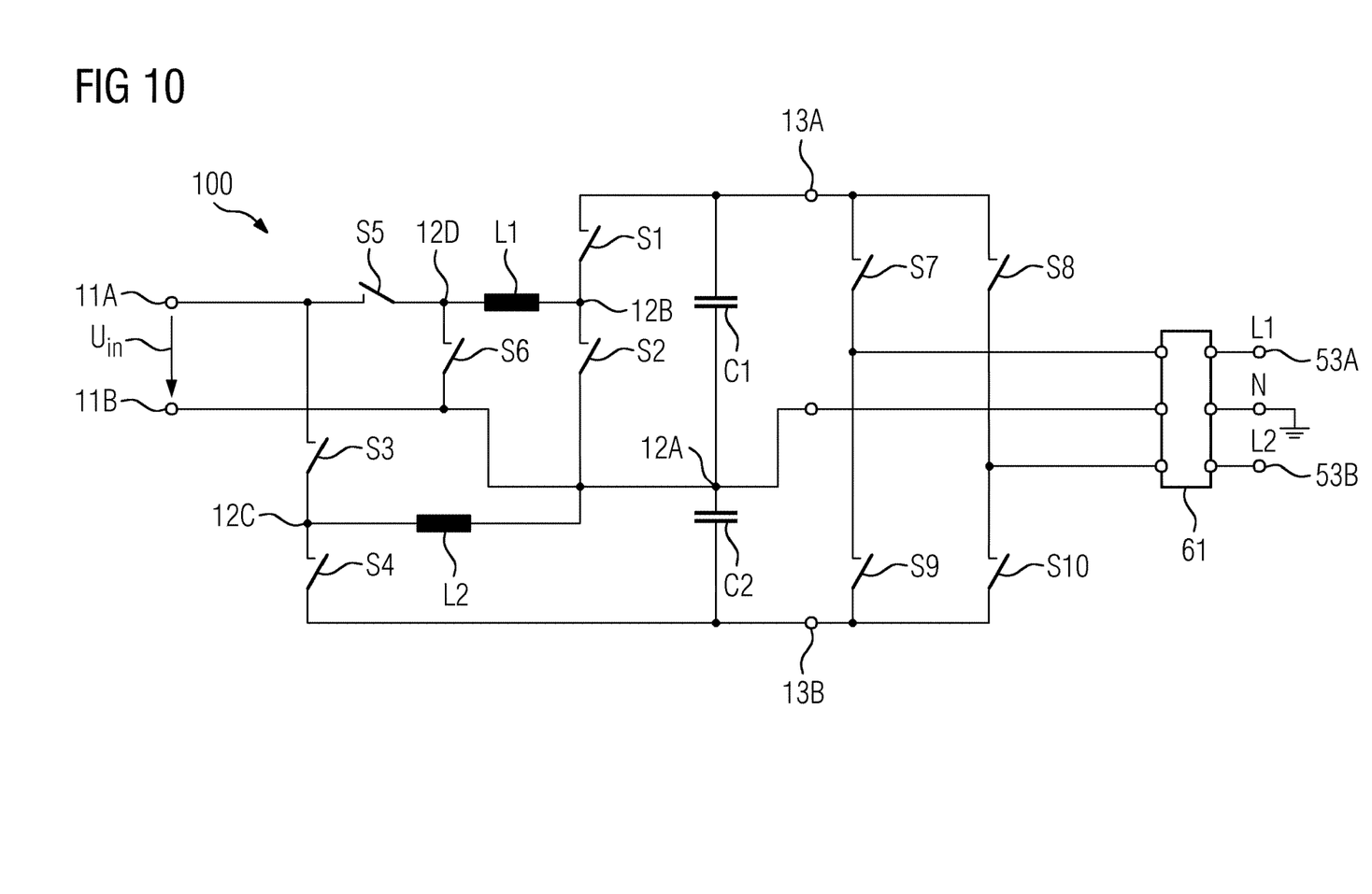

FIG. 10 finally shows as a further exemplary embodiment an inverter 100, which is likewise configured for use in a split phase grid. The construction of the inverter 100 including the configuration of the control device corresponds substantially to the construction of the inverter 80 according to FIG. 8, that is to say has the fifth and sixth semiconductor switch S5, S6 instead of the fifth and sixth inductance L5, L6 and the third capacitor C3. In addition, however, the first node 12A is provided as a further input for the EMI filter 61 and is led out of same as a neutral conductor. The other functionality corresponds to the inverter 80 according to FIG. 8.

Further embodiment possibilities for the inverter consist in that the inverter is based on the construction according to FIG. 4. This construction having inductances having a center tap may also be combined with the construction variants according to FIGS. 6, 8, 9 and 10.

The invention claimed is:

1. A DC coupled electrical converter for converting an input voltage applied to first connections to an output voltage, the converter comprising:
    a boost converter connected on the input side to the first connections;
    an inverting buck-boost converter connected on the input side to the first connections;
    a first output connection and a second output connection; and
    a circuit external to the boost converter and the inverting buck-boost converter, the circuit directly connected to an output-side positive pole of the boost converter and running to a direct connection with an output-side negative pole of the inverting buck-boost converter, the circuit including two capacitors directly connected in series between the output-side positive pole of the boost converter and the output-side negative pole of the inverting buck-boost converter;
    wherein the boost converter includes a first diode arranged between an output of a first inductance of the boost converter and the first output connection;
    wherein the inverting buck-boost converter includes a second diode directly connected to the second output connection and directly connected to an output of a second inductance of the inverting buck-boost converter;
    wherein an output-side negative pole of the boost converter and an output-side positive pole of the inverting buck-boost converter are connected to a center connection between the two capacitors.

2. The converter as claimed in claim 1, further comprising:
    a fifth semiconductor switch between the first inductance and the positive pole of the input voltage; and
    a sixth semiconductor switch or a third diode between the first inductance and the negative pole of the input voltage.

3. The converter as claimed in claim 1, further comprising:
    a third inductance in the first series circuit connected in series between the first semiconductor switch and the second semiconductor switch;

wherein the first inductance and third inductance comprise a joint inductance with a center tap for the second semiconductor switch.

4. The converter as claimed in claim 1, further comprising:
a fourth inductance connected in the second series circuit in series between the third semiconductor switch and the fourth semiconductor switch;
wherein the second inductance and the fourth inductance comprise a joint inductance with a center tap for the third semiconductor switch.

5. The converter as claimed in claim 1, wherein the semiconductor switches of the boost converter and the semiconductor switches of the inverting buck-boost converter are operated with staggered clocking.

* * * * *